Jan. 10, 1956    R. S. STRIMEL    2,729,973
MULTIRANGE LOAD CELL
Filed May 19, 1953    2 Sheets-Sheet 1
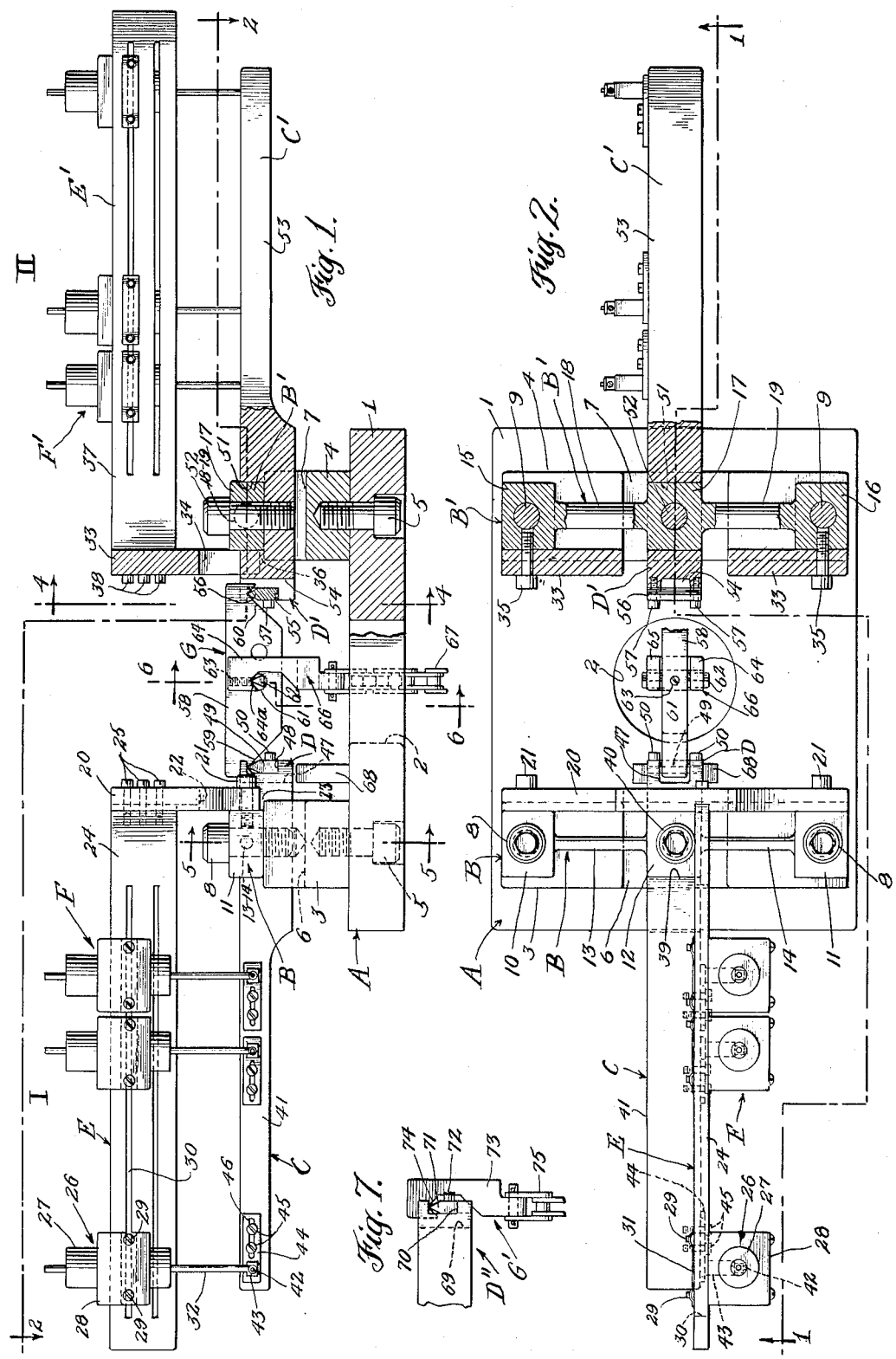
INVENTOR
Robert S. Strimel
BY
Synnestvedt & Lechner Jan. 10, 1956     R. S. STRIMEL     2,729,973
MULTIRANGE LOAD CELL
Filed May 19, 1953     2 Sheets-Sheet 2
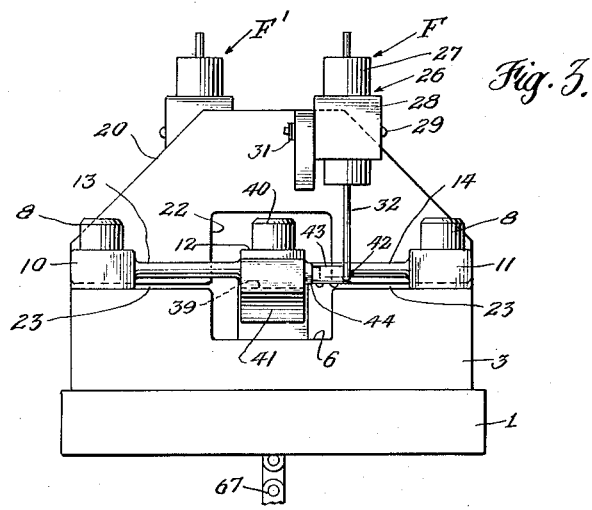
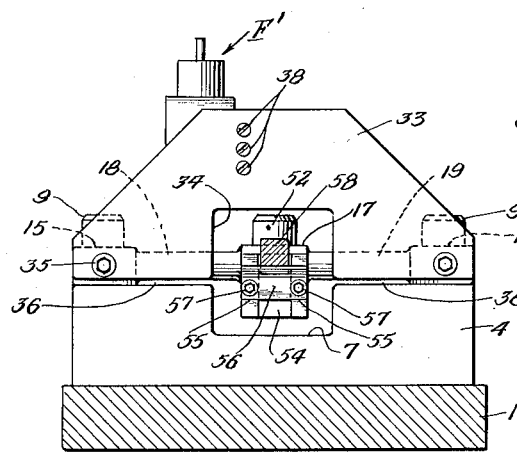
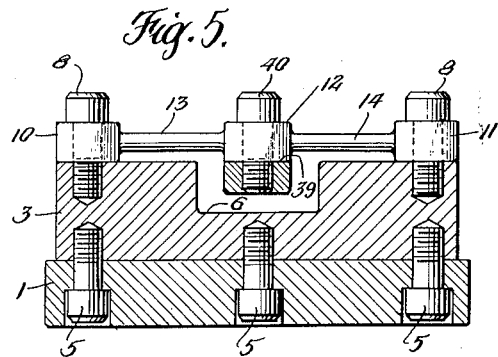
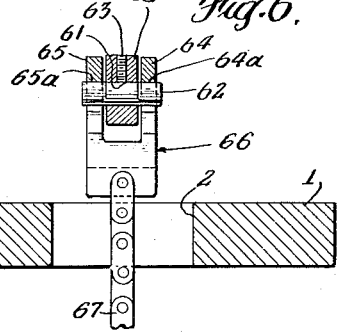
INVENTOR
Robert S. Strimel
BY
Lynnestvedt & Lechner

United States Patent Office 2,729,973
Patented Jan. 10, 1956

2,729,973

MULTIRANGE LOAD CELL

Robert S. Strimel, King Manor, Bridgeport, Pa., assignor to Tinius Olsen Testing Machine Company, Willow Grove, Pa., a corporation of Pennsylvania Application May 19, 1953, Serial No. 356,043

10 Claims. (Cl. 73—141)

This invention relates to a load cell for use with a testing machine or the like having a system for registering different ranges of stress applied to a test piece.

The invention contemplates two elongated members rigidly connected together by means including an elastic portion whereby the members may be moved relative to one another, the relative movement actuating certain control elements which operate in the stress registering system. Movement of the members is effected by means which may be connected to a mechanical or hydraulic stress-applying mechanism.

This invention may be utilized in a testing machine such as disclosed in my copending application, Serial No. 230,877, filed June 11, 1951, and assigned to the assignee of the present invention. That application discloses, inter alia, a novel system for indicating, registering, or recording the stress being applied to a test specimen. The system incorporates a plurality of transducers or control elements which are selectively interconnectible in the system for obtaining different ranges of stress indication. These control elements are individually activated by expansible devices such as Bourdon tubes, which are respectively selectively connectible to the hydraulic mechanism for applying stress to the test specimen for expansion by the pressure developed therein. As will be apparent from an inspection of that application, these control elements may be activated by mechanical linkages rather than the Bourdon tubes.

Thus, the control elements of the indicating system of the above-mentioned application may be operated by the load cell of the present invention, the means for effecting relative movement of the cell members being coupled to the hydraulic stress-applying mechanism.

It is preferred, in certain commercial testing, to load a test specimen mechanically rather than hydraulically. In such instances, the load cell of the present invention may be used in conjunction with the registering system of my above-mentioned application to indicate various ranges of stress. In these cases the load cell is activated by mechanical mechanism for applying stress to the test piece.

The cell of the invention may be constructed in a single or a double unit or a plurality of single units may be used. Where the unit is double, the two parts are substantial duplicates except for the elastic portion, which permits relative movement between parts of the cell. Also in the double unit, the connection with the stress-applying means is differential in form, that is to say, a certain portion of the stress is applied to each unit.

For purposes of general description, I will refer to a single unit cell. The cell comprises a load-responsive member which has two relatively large end portions adapted to be rigidly fastened to the frame of the testing machine. The end portions are connected to a relatively large mid-portion by cylindrically-shaped elastic portions, the cross sections of which are considerably less than the cross sections of the ends or mid-portions. To each end portion is fixedly secured a somewhat V-shaped bracket having at the top thereof an outwardly extending arm which is adapted to mount control elements such as the housings of differential transformers. The connection of the V-shaped bracket with the end portions is such that the bracket is isolated from the frame of the testing machine.

The mid-portion carries a control actuating member, part of which extends radially outwardly so as to be oriented in the same direction as, and substantially parallel to, the arm extending from the bracket. This part of the member carries means to which the stems of the transducer cores are connected.

The other side of the member also extends outwardly from the mid-portion and is provided with mechanism for connection with the stress-applying means.

The cell operates as follows: When stress is applied, the elastic portions tend to twist or pivot about the fixed end portions. Thus, the control actuating member tends to move in an arcuate path, which motion displaces the transducer cores.

Error-free operation is one of the principal advantages of the cell. This is accomplished, for example, by insuring that the only force which can cause relative motion between the arm and the control actuating member or, in other words, cause displacement of the transducer core, is the twisting motion of the elastic portion. Ordinary deflections, or even large deflections, in the testing machine frame or the like cannot cause such relative movement because of the mounting scheme for the bracket and the control actuating member.

The manner in which the foregoing is accomplished, together with certain other features and advantages, will be apparent from the following description and drawings wherein:

Figure 1 is a side elevational view partly in section taken along the line 1—1 of Figure 2, illustrating the general arrangement of an embodiment of the invention;

Figure 2 is a plan view partly in section taken along the line 2—2 of Figure 1;

Figure 3 is an end elevational view looking toward the right in Figure 1;

Figure 4 is a cross section taken substantially along the line 4—4 of Figure 1;

Figure 5 is a cross section taken on the line 5—5 of Figure 1 but with the load responsive member appearing in elevation;

Figure 6 is a cross section taken on the line 6—6 of Figure 1; and

Figure 7 is a detailed view illustrating the stress-applying connection for a single unit device.

For purposes of detailed description, a typical double unit will be referred to.

In Figures 1 and 2 the base or support for the cells I and II may be secured to the rigid frame of a testing machine and is designated by the reference character A. The load responsive members, the outer ends of which are fixedly secured to the base, are designated by the reference characters B and B'. The control actuating members, which are respectively secured to the center sections of the load responsive members and extend outwardly therefrom, are designated by the reference characters C and C'. The loading arms, which are attached to the center portions of the load responsive members, are designated by the reference characters D and D'. The bracket structures, which are secured to the outer ends of the load responsive members, are designated by the reference characters E and E'. The control elements, which are mounted on the brackets E and E', are designated by the reference characters F and F'. The reference character G designates the mechanism connectible with the stress-applying means of the testing machine for actuating the arms D and D'.

The base A comprises a flat, generally rectangular plate 1 having a centrally disposed aperture 2 and two transversely extending supports 3 and 4, which are secured to the plate 1 as by bolts 5—5. These supports are counterparts of one another and respectively have recesses 6 and 7. The manner in which the supports are secured to the plate and the structure of the recesses is best seen in Figure 5, which is a sectional view of the support 3 and plate 1.

The load responsive members B and B' are respectively secured to the top of the supports 3 and 4 as by bolts 8—8 and 9—9.

The load responsive member B comprises two generally cubicle end portions 10 and 11 having holes for receiving the bolts 8—8 threaded into the support 3. The member also has a generally cubicle-shaped center portion 12 and between this center portion and the end portions extend the generally cylindrical-shaped elastic portions 13 and 14. In the preferred form, the member is constructed by machining the described form from a single piece of material.

The load responsive member B' has end portions 15 and 16, center portion 17, which preferably are the same size as portions 10, 11 and 12. Extending between center portion 17 and the end portions 15 and 16 are elastic portions 18 and 19, which are generally cylindrical in shape but have a larger diameter than the elastic portions 13 and 14. The reason for this particular type of construction will be explained more in detail hereinafter.

The bracket structure E comprises a generally triangular portion 20, which is secured to the end portions 10 and 11 by bolts 21—21. As best seen in Figure 3, the member 20 is provided with a recess 22. As best seen in Figures 1 and 3, the portion 20 is bolted to the end portions 10 and 11 so that a positive clearance 23 exists between the bottom of the portion 20 and the top of the support 3. The manner of securing the bracket and the control actuating member together is an important part of the invention. This clearance effectively isolates the bracket structure from direct contact with the base A and hence the frame of the testing machine.

The bracket structure has an arm 24, which extends outwardly from the triangular-shaped portion 20 and is bolted thereto as by bolts 25. The arm 24 carries the control elements F.

The control elements, which preferably are differential transformers, are all mounted on the arm in the same manner and, therefore, the mounting scheme will be explained with reference to control element 26. Control element 26 comprises a housing 27, in which are mounted the windings (not shown). The housing 27 is disposed in a bracket 28 having bolts 29—29, which extend through the slot 30 and thread into the fastener 31. The slot permits the control element to be variably positioned along the length of the arm. The core (not shown) of the control element is attached to a stem 32, which extends downwardly and is connected to the control actuating member C.

The bracket structure E' is constructed in a manner similar to bracket structure E having a triangular-shaped portion 33 with a recess 34 and being bolted to the end portions 15 and 16 as by bolts 35—35. As seen in Figure 4, a clearance 36 is provided between the bottom of the triangular-shaped portion 33 and the support 4. The arm 37 is bolted to the portion 33 as by bolts 38. The arm carries the control elements F', which are secured thereto in the same manner as described in connection with control element 26.

The control actuating member C and the load-applying arm D are, in the preferred embodiment, formed as a single unit, the unit having a recess 39 into which fits the center portion 12, the center portion being secured in the recess by the bolt 40.

The member C generally comprises an arm 41, which extends outwardly in the same direction and generally parallel to the arm 24. The arm 41 carries means for connecting the transformer stems thereto. The connection means for each stem are identical and the scheme will be described only in connection with stem 32. Stem 32 is pivotally connected as by pivot 42 to an arm 43, which is secured to a slider 44. The slider 44 is secured to the arm 41 by bolts 45 and may be adjusted along the arm 41 by means of the slot 46.

The load-applying arm D is provided with a vertically-extending slot 47. At the outer side of the slot is provided a recess 48, in which is disposed a knife edge 49 secured to the arm as by bolts 50—50.

The control actuating member C' and the load-applying arm D' are constructed in a manner similar to that of C and D. The slot 51 mounts the center portion 17, which is secured in the slot as by bolt 52. The arm 53 is provided with means for connection to the core stems of control elements F' similarly as described in connection with stem 32.

The load-applying arm D' has a vertically extending slot 54, a recess 55 carrying a knife edge 56, which is bolted to the arm as by bolts 57—57.

The mechanism G comprises a bracket 58, which has slots 59 and 60 respectively engaging the knife edges 49 and 56. The bracket also has an aperture 61 through which extends the knife edge 62. The knife edge is secured in the bracket by set screw 63.

The bracket 58 is disposed between the upwardly extending arms 64 and 65 of shackle 66. The arms are respectively provided with slots 64a and 65a, which engage the knife edge 62. The lower end of the shackle is secured to a chain 67, which extends through the aperture 2 for connection to the stress-applying means of a testing machine.

As seen in Figure 1, a stop 68 extends upwardly from the plate 1 to just below the arm D. The purpose of this stop will be explained hereinafter.

Where a single cell is used, the load-applying arm D" and the mechanism G' for actuating the arm is shown in Figure 7. The arm comprises a generally vertical slot 69, a recess 70 carrying a knife edge 71, which is secured to the arm as by bolts 72. The shackle 73 has a slot 74 for engaging the knife edge. The lower end of the shackle is secured to a chain 75.

The manner in which the load cells operate will be described following.

In the embodiment shown, the load cell I is designed for response to small ranges of stress while the load cell II is designed for response to higher ranges of stress, this being accomplihed by the cross sectional areas of the respective elastic portions, the smaller area twisting more than the larger for a given load.

When a downward force is exerted on the chain 67, this force is transferred to he load-applying arms D and D'. In the embodiment shown, one-half of the load is being applied to each arm. Assuming initially a very small load, the arm D tends to move downwardly and since the load responsive member B is fixed at each end, this movement is restrained by the elastic portions 13 and 14, which tend to twist. This twisting movement, therefore, is reflected by the upward motion of the control actuating member C. As the member C moves, the stems of the transducers will be displaced, the greatest movement being imparted to the stem 32, since this is located farthest from the center of movement, namely, the axis of the elastic portions 13 and 14.

As has been mentioned heretofore, the control elements F and F' are preferably differential transformers. The transformers develop voltages proportional to the stress being applied to the article under test and are selectively connectible in a circuit for measuring stress such as a circuit described in my above referred to copending application. The transducer 27 would be used for very low values of stress, since its core has the greatest movement for a given load.

As the load is increased, the elastic portions 13 and 14 continue to twist and the arm D moves downwardly until it engages the stop 68. At this time, further increase in load will affect only the right-hand load cell. This cell operates in a manner identical to the left-hand load cell, the elastic portions 18 and 19 being adapted to twist with the arm D' moving downwardly and the control actuating member C' moving upwardly to displace the cores of transducers F', which may be connected for operation in accordance with test requirements.

From the above description, it will be apparent that the only motion, except outright distortion of the cell or the base, which can cause relative movement between a bracket arm and a control actuating member is the twisting movement of the elastic portion. This is accomplished by the manner in which the bracket structure is connected to the load responsive member, i. e., isolating the bracket from the base.

Thus, by means of the above, deflections in the testing machine frame have no effect on the measuring efficiency of the cell. Obviously the elimination of such errors is extremely important in test work.

While I have described the control elements as transformers, it will be apparent that other equivalent means may be used without departing from the spirit and scope of the invention. Also, it will be apparent that certain mechanical linkage may be connected between a bracket structure and a control actuating member in a manner to drive a load indicating pointer or the like.

Further, it will be apparent that the bracket 58 may be arranged such that various proportions of the stress can be applied to the arms D and D'. Thus, for example, in a double unit the cross sectional area of the elastic portions of each cell may be the same, with the bracket 58 being arranged such that one-quarter of the stress is applied to cell I and three-quarters to cell II. With this arrangement the cells then would be adapted for different ranges of stress.

I claim:

1. A load cell comprising: a support for the cell; a load responsive member generally elongated, each end of which is fixedly secured to said support; a load applying arm radially extending from said load responsive member, the arm being positioned between said fixed ends; a bracket secured to each said fixed end but spaced apart from said support whereby the only connection between the bracket and the support is through said fixed ends; a second arm extending from said bracket and adapted to mount control elements; and a control actuating member radially extending from said load responsive member, the actuating member being positioned between said fixed ends and having means connectible with control elements mounted on said second arm.

2. A construction in accordance with claim 1 further including a plurality of control elements mounted on said second arm each having an operating portion connected with said control actuating member.

3. A load cell comprising: a support for mounting the cell in a testing mechanism or the like; a load responsive member having two end portions and a third portion therebetween adapted to be twisted, the two end portions being fixedly secured to said support; a bracket fixedly secured to each said end portion but spaced apart from said support whereby the only connection between the bracket and the support is through said end portions; an arm radially extending from said third portion whereby to be movable when the third portion is twisted; a second arm extending from said bracket in a direction generally parallel to first said arm; and means for twisting said third portion.

4. A load cell comprising: a support for mounting the cell on a testing machine or the like; a load responsive member having two end portions and a third portion therebetween adapted to be twisted, the two end portions being fixedly secured to said support; a bracket fixedly secured to at least one end portion and spaced from said support whereby the only connection between the bracket and the support is through said end portions; an arm radially extending from said third portion, the twisting of the third portion causing movement of the arm; a second arm extending from said bracket in a direction generally parallel to first said arm; means providing for the twisting of said third portion; and a control element including a coil and a core interconnected between said arms, the movement of first said arm causing relative displacement of the coil and core.

5. A load cell comprising: a support for mounting the cell on a testing machine or the like; a load responsive member having two end portions and a third portion therebetween adapted to be twisted, the two end portions being fixedly secured to said support; a bracket fixedly secured to at least one end portion and spaced from said support whereby the only connection between the bracket and the support is through said end portion; a first arm radially extending from said third portion, the twisting of the third portion causing movement of the arm; a second arm extending from said bracket in a direction generally parallel to said first arm; a third arm extending from said third portion and adapted to be connected to load-applying means to provide for twisting of the third portion; and a control element including a coil and a core interconnected between said first and second arms, the movement of the first arm causing relative displacement between the coil and the core.

6. In a testing machine having a rigid frame together with means to stress a test piece and a system to register the stress including a plurality of control elements, a load cell comprising: a first load responsive member having two end portions adapted to be fixedly secured to said rigid frame and a portion intermediate the two ends adapted to be twisted; a first bracket secured to one of said ends and adapted to mount control elements; a first control actuating member connected with said intermediate portion for movement responsive to said twisting and having means connectible with control elements; a second load-responsive member having two end portions adapted to be fixedly secured to said rigid frame and a portion intermediate last said ends adapted to be twisted, the cross sectional area of last said intermediate portion being less than the cross sectional area of first said intermediate portion; a second bracket secured to one of last said ends and adapted to mount other control elements; a second control actuating member connected with last said intermediate portion for movement responsive to said twisting and having means connectible with said other control elements; and mechanism making common connection with said intermediate portions for twisting the same, the mechanism being connectible with said stress-applying means.

7. A construction in accordance with claim 6 further including means to limit said movement of the second control actuating member.

8. A load cell to actuate control elements and adapted to be mounted on a rigid body comprising: a generally elongated first member adapted to be fixedly mounted and having means for mounting control elements; a movable member generally elongated and mounted in a direction generally parallel to said first member and having means connectible with said control elements; means for mounting said movable member to said rigid body; mechanism independent of said mounting means fixedly securing the two members together including an elastic portion whereby said movable member may be twisted relative to said first member; a generally elongated second member adapted to be fixedly mounted and having means for mounting other control elements; a second movable member generally elongated and mounted in a direction generally parallel to said second member and having means connectible with said other control elements; second means for mounting said second movable member to said rigid body; second mechanism independent of said second mounting means fixedly securing the two last said members together including an elastic portion whereby said second movable member may be twisted relative to said second member, the product of the coefficient of rigidity and unit strain for a given stress of said elastic portion being greater than the product of the coefficient of rigidity and unit strain of the first said portion of the same stress; and mechanism making common connection with two said mounting means and being connectible with said stress-applying means.

9. A construction in accordance with claim 8 further including means to limit the relative twisting movement between said second member and said second movable member.

10. In a testing machine having a rigid frame together with means to stress a test piece and a system to register the stress including a plurality of control elements, a load cell comprising: a first load-responsive member having two end portions adapted to be fixedly secured to said rigid frame and a portion intermediate the two ends adapted to be twisted; a first bracket secured to one of said ends and adapted to mount control elements; a first control actuating member connected with said intermediate portion for movement responsive to said twisting and having means connectible with control elements; a second load-responsive member having two end portions adapted to be fixedly secured to said rigid frame and a portion intermediate last said ends adapted to be twisted, the cross sectional area of last said intermediate portion being equal to the cross sectional area of first said intermediate portion; a second bracket secured to one of last said ends and adapted to mount other control elements; a second control actuating member connected with last said intermediate portion for movement responsive to said twisting and having means connectible with said other control elements; and mechanism connectible with said stress-applying means making common connection with said intermediate portions whereby different proportions of the stress being applied are transmitted to the intermediate portions for twisting the same.

References Cited in the file of this patent

UNITED STATES PATENTS

| 2,421,222 | Schaevitz | May 27, 1947 |
| 2,620,657 | Stovall | Dec. 9, 1952 |
| 2,625,820 | Whitehead | Jan. 20, 1953 |
| 2,641,460 | Larson | June 9, 1953 |

FOREIGN PATENTS

| 722,915 | Germany | July 24, 1942 |